Patented July 28, 1925.

1,547,369

UNITED STATES PATENT OFFICE.

GEORGE F. DICK AND GLADYS HENRY DICK, OF EVANSTON, ILLINOIS.

SCARLET-FEVER TOXIN AND ANTITOXIN AND PROCESS FOR PRODUCING THE SAME.

No Drawing.     Application filed November 28, 1924.   Serial No. 752,792.

*To all whom it may concern:*

Be it known that we, GEORGE F. DICK and GLADYS HENRY DICK, both citizens of the United States, residing at Evanston, Illinois, have invented certain new and useful Improvements in Scarlet-Fever Toxin and Antitoxin and Processes for Producing the Same, of which the following is a specification.

Our invention relates to a scarlet fever toxin, its applications to medical use, and to the process of producing it and also to a scarlet fever antitoxin, its applications to medical use and to the process of producing it.

Among the objects of our invention are to provide a scarlet fever toxin prepared in form suitable for medical use, as a means of identifying scarlet fever; as a skin test to determine susceptibility to scarlet fever; for use as an immunization to prevent scarlet fever, and as a means for producing scarlet fever antitoxin.

Prior to our invention and discovery, experimental scarlet fever had not been produced in animals or in man by inoculation of a pure culture of any organism. Attempts had been made to produce experimental scarlet fever in man, by inoculation with material from erythematous areas, with serum from miliary vesicles, from skin scales, from blood, from filtrates of throat mucus, and from pure cultures of organisms isolated from scarlet fever patients. Accidental inoculations of human beings with materials of scarlet fever origin had been reported but they had occurred under circumstances that threw no light on the origin and development of the disease.

We produced experimental scarlet fever by inoculation of human beings with a pure culture of hemolytic streptococcus. This was obtained by inoculating a volunteer with a pure culture of a hemolytic streptococcus isolated from a lesion on the finger of a scarlet fever patient. After numerous experiments we found that scarlet fever is caused by a specific hemolytic streptococcus.

We next discovered that the hemolytic streptococcus produced the scarlatinal rash when growing in the throat of human beings and that the filtered cultures of this hemolytic streptococcus contained a sterile toxin specific to scarlet fever. We also ascertained that when certain amounts of this toxin alone were injected into susceptible persons it caused general malaise, nausea, vomiting, fever, and a generalized scarlatinal rash.

In other words, we discovered that this sterile toxin itself is capable of producing the characteristic symptoms of scarlet fever, including the rash.

*Securing and preparation of the toxin.*

Our toxin is preferably obtained by inoculating broth with a pure culture of hemolytic streptococci specific to scarlet fever. A small amount of blood is usually added to the broth at the time of inoculation. After incubation, the broth cultures are passed through porcelain filters to remove the bacteria. The living bacteria may be also removed or killed by heat treatment or by the addition of an antiseptic. After the living bacteria are removed the filtrate is cultured for sterility and generally kept in a refrigerator. The resultant toxin is then standardized.

The undiluted toxin is so strong that even a fraction of a drop will produce a generalized rash in susceptible persons.

One method of standardizing the toxin is to compare various dilutions of a new batch of toxin with a previously standardized batch, by means of skin tests. As a result of a multitude of tests extending over a period of a year, we have been able to obtain a standardized dilution of our toxin which when injected in a standardized amount into a susceptible person will produce a characteristic positive reaction. In order to standardize the toxin of a new batch, we prepare various dilutions of this toxin, one drop of the new toxin in various amounts of water containing a small amount of salt; to illustrate, one drop of the toxin to one thousand drops of such water or one drop of toxin to one thousand five hundred drops of water and so on. We then inject 0.1 c. c. of the standardized toxin in a person susceptible to scarlet fever preferably in the forearm, and at the same time inject the same amount, that is, 0.1 c. c. of the new batch of toxin of a predetermined dilution in the other forearm of the same person and then compare the reactions. If the reactions from the two injections are alike when tested on various persons and on several occasions, we know that the new batch as thus diluted is of the correct standardization. There must be positive reactions in standardizing. If the tests are otherwise, other dilutions are tried until the correct standardization is obtained. The toxin is standardized by means of skin tests on susceptible animals or human beings.

Application and uses of toxin.

1. The identification of scarlet fever streptococci.
2. Skin tests to determine susceptibility to scarlet fever.
3. The preventative immunization.
4. For the production of scarlet fever antitoxin.

The identification of scarlet fever streptococci.

Until the discovery and preparation of our toxin, there had been no satisfactory way of identifying scarlet fever streptococci. Agglutination tests had not furnished a reliable means of identifying them. Certain strains could not be tested because of spontaneous agglutination. No serum agglutinates streptococci specifically from all cases of scarlet fever. Previous to our discoveries and invention there were no morphologic, cultural, or immunologic characteristics by which the streptococci of scarlet fever origin could be differentiated from hemolytic streptococci associated with other pathologic processes. Experimental scarlet fever had not been produced, and the lasting immunity usually conferred by one attack of the disease was not considered characteristic of streptococcus infections.

The use of our toxin serves as a method of recognizing those organisms that are capable of producing scarlet fever. The organism to be identified is isolated in pure culture and is grown in broth containing a small amount of blood. After incubation from two to four days, the broth culture is filtered and the sterility of the filtrate is determined by culture and it is then kept in a refrigerator. After its sterility is determined, a part of the filtrate is diluted one to five hundred in sterile physiologic sodium chloride solution. One cubic centimeter of this dilution is mixed with an equal amount of salt solution and another 1 c. c. is mixed with 1 c. c. of sterile convalescent scarlet fever serum. Both mixtures are incubated one hour and skin tests are made on a person known to be susceptible to scarlet fever, using 0.1 c. c. of each mixture. At the same time, a control test is made with 0.1 c. c. of the standardized skin test solution used to determine susceptiblity of scarlet fever. The reactions are observed at the end of twenty-four hours. The control reaction with the skin test solution should be positive. If the mixture of filtrate with salt solution gives a positive reaction, while the filtrate convalescent serum mixture gives a negative result, it may be considered that the organism under consideration is capable of producing a toxin that is neutralized by convalescent scarlet fever serum and is therefore a scarlet fever streptococcus.

Method of using toxin as a skin test for determining susceptibility to scarlet fever.

Weak solutions of the toxin may be employed in skin tests to determine susceptibility to scarlet fever. The standardized toxin is diluted so that 0.1 c. c. will represent a skin test dose. The test consists of an intradermal injection of exactly 0.1 c. c. of the skin test dilution on the flexor surface of the forearm. The reaction is observed at the end of twenty-four hours. An area of reddening 1 c. m. in diameter represents some degree of susceptibility to scarlet fever. An area of reddening less than 1 c. m. in diameter is a negative test.

Method of using the toxin as an immunization to prevent scarlet fever.

The toxin may be injected in proper doses for the immunization of persons having positive skin tests. After immunization, the skin tests of these persons become negative and they do not contract scarlet fever from exposure. The preferred method of using the toxin in preventative immunization to scarlet fever consists in injecting the proper amount of toxin to render the skin test negative. The amount of toxin to be used vary according to the degree of susceptibility. We have thus far used doses ranging from 100 to 10,000 times the amount used in the skin test. The reaction following proper dosage is usually only a local one and never serious.

Following immunization, a skin test should be made to determine the degree of immunity that has been obtained. A type of skin reaction frequently found after immunization is one that appears quickly but fades before twenty-four hours and is therefore negative. If the skin test is still positive after one or more doses of toxin have been injected more toxin should be injected. Experience has shown that immunization must be carried to the point of a negative skin test.

Use of the toxin in the preparation of a scarlet fever antitoxin.

Our scarlet fever toxin is also used for the production of a scarlet fever antitoxin. By immunizing horses with subcutaneous injections of scarlet fever toxin, we obtained an antitoxin of such strength that 10 c. c.

neutralized twenty times the amount of toxin which caused nausea, vomiting, fever and a scarlatinal rash in susceptible adults.

In the preparation of our scarlet fever antitoxin, the following method is preferably used. The strains of hemolytic streptococci that caused scarlet fever in human beings yield toxin of practically the same strength in all the different lots so that it is not necessary to standardize accurately toxin prepared from these strains for immunizing horses. Flasks of plain broth containing one percent sterile defibrinated blood are inoculated with pure cultures of the hemolytic streptococci. After six days incubation, the cultures are filtered through filter paper until clear and then passed through a Berkefeld filter. The sterility of the filtrate is determined by culture and it is kept in the refrigerator. The sterile toxin is injected in horses (which are especially desirable for this purpose) subcutaneously in gradually increasing doses beginning with 20 c. c. and increasing to one liter. The horses are then continued on injections of about 500 c. c. of the undiluted toxin every five days. The sterile toxin does not cause abscesses, and the horses remain in good condition. After preliminary tests show that the horse is producing good antitoxin, it is bled and the serum or plasma is concentrated and refined. The concentration and refinement is essential, not because the antitoxin content of the unconcentrated serum is not high enough, but to avoid unnecessarily frequent and severe serum reactions.

An amount of scarlet fever toxin corresponding to one thousand skin test doses is capable of causing general malaise, nausea, vomiting, a fever of 101 F. and a general scarlatinal rash in susceptible adults. In other words 1000 skin test doses of toxin if injected without previous immunization may produce a clinical condition resembling a mild attack of scarlet fever. We have taken the amount of antitoxin required to neutralize this dose of toxin as a basis of the standardization of scarlet fever antitoxin. Any antitoxin used should be of such strength that 1 c. c. of the concentrated and refined serum will neutralize 1000 skin test doses of the toxin. It is possible to obtain serums considerably stronger than this minimum requirement of potency.

In the preparation, this concentrated and refined antitoxin is diluted 1 to 10 in sterile physiologic sodium chloride solution. 2 c. c. of this diluted antitoxin is mixed with 2 c. c. of the toxin solution. The solution of toxin used is sometimes of such strength that each cubic centimeter represents 100 skin test doses. Two control solutions are made; one of equal parts of toxin and salt solution, the other of equal parts of the diluted antitoxin and salt solution. These three mixtures are incubated one hour. Skin tests are then made with 0.1 c. c. of each mixture in persons with strongly positive skin reactions. Persons with slightly positive reactions are not acceptable for these tests. On observation at the end of twenty-four hours, the test made with the antitoxin alone should be negative. If this is positive, the person is sensitive to horse serum and is not useful for the standardization. The test with the toxin alone should be positive. The test with the toxin and antitoxin mixture will be negative if the antitoxin is sufficiently strong. At the end of forty-eight hours, another observation is made. For further standardization the same tests are repeated with higher dilutions of the antitoxin.

We employ as a therapeutic dose an amount of antitoxin sufficient to neutralize approximately twenty or more times the quantity of toxin known to produce the characteristic symptoms of scarlet fever in adults. For convenience we speak of this amount of antitoxin which neutralizes twenty thousand skin test doses, as a therapeutic dose. Each scarlet fever patient receives one such dose and in a few of the most severe cases two therapeutic doses are given.

The concentration and refinement of the antitoxic serum and its exact standardization make practical its use as a routine measure in the treatment of scarlet fever.

What we claim is—

1. The process of isolating hemolytic streptococci specific to scarlet fever, growing them in a suitable medium, obtaining a sterile toxin therefrom, injecting an animal with the sterile toxin and obtaining therefrom a serum containing an antitoxin specific to scarlet fever.

2. The process of isolating hemolytic streptococci specific to scarlet fever, growing them in a suitable medium, obtaining the sterile toxin therefrom, injecting an animal with the sterile toxin and obtaining an antitoxin specific to scarlet fever.

3. The process of isolating hemolytic streptococci specific to scarlet fever, growing them in a suitable medium, obtaining the sterile toxin therefrom, injecting an animal with the sterile toxin, obtaining an antitoxin specific to scarlet fever, and injecting the antitoxin into or through the skin of a human being.

4. An antitoxin specific to scarlet fever obtained from the blood of an animal which has been injected with sterile toxin grown from a pure culture of hemolytic streptococci specific to scarlet fever.

5. An antitoxin specific to scarlet fever obtained from the blood of an animal which has been injected with sterile toxin specific to scarlet fever.

6. The process of isolating hemolytic streptococci specific to scarlet fever growing them in a suitable medium and obtaining a sterile toxin therefrom.

7. The process of isolating hemolytic streptococci specific to scarlet fever, growing them in a suitable medium, obtaining a sterile toxin therefrom, and injecting the toxin into or through the skin of a human being.

8. A sterile toxin specific to scarlet fever.

9. A sterile toxin specific to scarlet fever obtained from a pure culture of hemolytic streptococci specific to scarlet fever.

10. A sterile toxin specific to scarlet fever obtained from hemolytic streptococci specific to scarlet fever.

In witness whereof, we hereunto subscribe our names to this specification.

GEORGE F. DICK.
GLADYS HENRY DICK.